United States Patent
Wilson

(10) Patent No.: US 6,716,929 B2
(45) Date of Patent: Apr. 6, 2004

(54) SUPERABSORBENT POLYMERS HAVING A SLOW RATE OF ABSORPTION

(75) Inventor: Larry R. Wilson, Beaverton, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/189,136

(22) Filed: Jul. 3, 2002

(65) Prior Publication Data

US 2002/0193492 A1 Dec. 19, 2002

Related U.S. Application Data

(62) Division of application No. 09/455,926, filed on Dec. 7, 1999, now Pat. No. 6,579,958.

(51) Int. Cl.$^7$ .................................................. C08F 8/44
(52) U.S. Cl. ........................ 525/327.8; 525/328.3; 525/330.2; 525/119; 526/185; 526/183; 526/91; 526/92; 524/317
(58) Field of Search .......................... 524/317; 525/119, 525/327.8, 314, 123, 329.7, 329.9, 375, 381, 382, 384; 428/357, 402, 403; 424/489

(56) References Cited

U.S. PATENT DOCUMENTS

| | | |
|---|---|---|
| 3,669,103 A | 6/1972 | Harper et al. ............... 128/156 |
| 3,670,731 A | 6/1972 | Harmon ...................... 128/284 |
| 3,926,891 A | 12/1975 | Gross et al. ............... 260/29.6 |
| 3,935,099 A | 1/1976 | Weaver et al. ............... 210/43 |
| 3,997,484 A | 12/1976 | Weaver et al. ............. 260/17.4 |
| 4,043,952 A | 8/1977 | Ganslaw et al. ....... 260/17.4 ST |
| 4,076,663 A | 2/1978 | Masuda et al. ............ 260/17.4 |
| 4,090,013 A | 5/1978 | Ganslaw et al. ............... 526/15 |
| 4,093,776 A | 6/1978 | Aoki et al. ................... 428/402 |
| 4,127,944 A | 12/1978 | Giacobello ........................ 34/9 |
| 4,190,562 A | 2/1980 | Westerman ................ 260/17.4 |
| 4,286,082 A | 8/1981 | Tsbuakimoto et al. ...... 526/240 |
| 4,338,371 A | 7/1982 | Dawn et al. ................. 428/283 |
| 4,340,706 A | 7/1982 | Obayashi et al. ........... 526/207 |
| 4,354,901 A | 10/1982 | Kopolow .................... 162/158 |
| 4,430,086 A | 2/1984 | Repke ......................... 604/368 |
| 4,446,261 A | 5/1984 | Yamasaki et al. ............. 524/40 |
| 4,447,364 A | 5/1984 | Staal ...................... 260/448 R |
| 4,459,396 A | 7/1984 | Yamasaki et al. ........... 526/200 |
| 4,500,315 A | 2/1985 | Pieniak et al. .............. 604/379 |
| 4,537,590 A | 8/1985 | Pieniak et al. .............. 604/379 |
| 4,548,847 A | 10/1985 | Aberson et al. ............... 428/74 |
| 4,596,567 A | 6/1986 | Iskra .......................... 604/368 |
| 4,610,678 A | 9/1986 | Weisman et al. ........... 604/368 |
| 4,654,039 A | 3/1987 | Brandt et al. ............... 604/368 |
| 4,666,983 A | 5/1987 | Tsubakimoto et al. ...... 525/119 |
| 4,673,402 A | 6/1987 | Weisman et al. ........... 604/368 |
| 4,676,784 A | 6/1987 | Erdman et al. ............. 604/368 |
| 4,683,274 A | 7/1987 | Nakamura et al. .......... 526/216 |
| 4,708,997 A | 11/1987 | Stanley et al. .............. 526/207 |
| 4,734,478 A | 3/1988 | Tsubakimoto et al. ...... 527/300 |
| 4,798,603 A | 1/1989 | Meyer et al. ................ 604/378 |
| 4,833,222 A | 5/1989 | Siddall et al. ............... 526/200 |
| 4,857,610 A | 8/1989 | Chmelir et al. ............... 526/88 |
| 4,892,598 A | 1/1990 | Stevens et al. ............... 156/91 |
| 4,935,022 A | 6/1990 | Lash et al. .................. 604/368 |
| 4,938,756 A | 7/1990 | Salek ......................... 604/368 |
| 4,954,562 A | 9/1990 | Anderson ................... 524/779 |
| 4,973,325 A | 11/1990 | Sherrod et al. ............. 604/368 |
| 4,985,518 A | 1/1991 | Alexander et al. .......... 526/240 |
| 4,986,882 A | 1/1991 | Mackey et al. .............. 162/109 |
| 4,990,541 A | 2/1991 | Nielsen et al. ................ 521/70 |
| 5,002,986 A | 3/1991 | Fujiura et al. ................ 524/47 |
| 5,011,864 A | 4/1991 | Neisen et al. ................. 521/70 |
| 5,061,259 A | 10/1991 | Goldman et al. ........... 604/368 |
| 5,145,906 A * | 9/1992 | Chambers et al. .......... 524/732 |
| 5,147,343 A | 9/1992 | Kellenberger ............... 604/368 |
| 5,149,335 A | 9/1992 | Kellenberger et al. ...... 604/372 |
| 5,300,192 A | 4/1994 | Hansen et al. .............. 162/184 |
| 5,308,896 A | 5/1994 | Hansen et al. ................ 524/13 |
| 5,364,382 A | 11/1994 | Latimer et al. .............. 604/378 |
| 5,429,629 A | 7/1995 | Latimer et al. .............. 604/378 |
| 5,447,727 A | 9/1995 | Graham ...................... 424/487 |
| 5,486,166 A | 1/1996 | Bishop et al. ................. 60/366 |
| 5,520,673 A | 5/1996 | Yarbrough et al. ......... 604/378 |
| 5,531,728 A | 7/1996 | Lash .......................... 604/378 |
| 5,538,783 A | 7/1996 | Hansen et al. .............. 428/283 |
| 5,543,215 A | 8/1996 | Hansen et al. .............. 428/283 |
| 5,562,646 A | 10/1996 | Goldman et al. ........... 604/368 |
| 5,629,377 A | 5/1997 | Burgert et al. .............. 524/832 |
| 5,651,862 A | 7/1997 | Anderson et al. ........... 162/127 |
| 5,728,082 A | 3/1998 | Gustafsson et al. ......... 604/368 |
| 5,744,564 A | 4/1998 | Stanley, Jr. et al. ...... 526/317.1 |
| 5,795,439 A | 8/1998 | Euripides et al. ........... 162/100 |
| 5,800,418 A | 9/1998 | Ahr ............................ 604/368 |
| 5,855,571 A | 1/1999 | Steger et al. ................ 604/368 |
| 5,883,158 A | 3/1999 | Nambu et al. .............. 523/412 |

FOREIGN PATENT DOCUMENTS

| | | |
|---|---|---|
| EP | 0 316 518 A2 | 5/1989 |
| EP | 0 530 438 A1 | 12/1993 |
| EP | 0 530 481 A1 | 12/1993 |
| EP | 0 631 768 A1 | 4/1998 |
| GB | 2 280 115 A | 1/1995 |
| KR | 9615186 B | 11/2001 |
| WO | WO 91/05108 | 4/1991 |
| WO | WO 93/05080 | 3/1993 |
| WO | WO 98/49221 | 11/1998 |

OTHER PUBLICATIONS

F. L. Buchholz et al., Modern Superabsorbent Polymer Technology, (1998) p. 153.
F. L. Buchholz et al., "Modern Superabsorbent Polymer Technology," (1998) pp. 57–58.

* cited by examiner

Primary Examiner—Tatyana Zalukaeva
(74) Attorney, Agent, or Firm—Paul D. Hayhurst

(57) ABSTRACT

Superabsorbent polymers having a slow rate of absorption, and a process for their preparation. The superabsorbent polymer has a slow rate of absorption, is crosslinked with a covalent crosslinking agent and the metal of a polyvalent metal coordination compound, has the metal of the coordination compound distributed essentially homogeneously throughout the polymer, and has an Absorption Rate Index of at least about 5 minutes.

20 Claims, No Drawings

SUPERABSORBENT POLYMERS HAVING A SLOW RATE OF ABSORPTION

This is a divisional Application of Ser. No. 09/455,926 filed Dec. 7, 1999, now U.S. Pat. No. 6,579,958.

BACKGROUND OF THE INVENTION

This invention relates to superabsorbent polymer compositions and a process for preparing said compositions.

Superabsorbent polymers are well-known materials which commonly are used in personal care articles such as diapers. These polymers are known to absorb several times their weight of, for example, water, saline solution, urine, blood, and serous bodily fluids.

The development of increasingly thinner diapers has led to diapers having a high density absorbent core, the core having an increased superabsorbent polymer fraction in the superabsorbent polymer/cellulose fluff mixture. Accordingly, the need to have homogeneous distribution of liquid in the absorbent core is increasingly important in order to fully utilize the highly swellable polymer's storage capacity. However, the distribution of liquid is negatively affected by a reduction in the amount of cellulose fluff in the absorbent core. Thus, additional requirements are now being placed on the highly swellable, liquid-storing polymers in terms of liquid management. The liquid-storing polymers must allow, or support, the distribution of the liquid within the superabsorbent polymer/fluff mix, even in a superabsorbent polymer/fluff mix with a high fraction of highly swellable polymers.

In diapers having a high superabsorbent polymer/fluff ratio, the low fluff content can result in poorer liquid distribution, since the distribution capacity of the fluff is insufficient to compensate for the high absorption rate and absorption capacity of conventional superabsorbent polymers. Accordingly, a very large proportion of body fluid entering a personal care article is absorbed by the superabsorbent polymer in the immediate vicinity of the point of fluid entry.

The swelling of a conventional superabsorbent polymer occurs in such a way that a very high absorption rate is observed immediately after an aqueous liquid is added. After only a few minutes, a highly swellable polymer based on crosslinked, partially neutralized polyacrylate has achieved approximately 95% of its absorption capacity, under conditions of free swelling. This behavior is a typical property of crosslinked polyacrylate superabsorbent polymers.

The rapid expansion of the polymer particles around the point of entry of the body fluid into the area of the absorbent core causes a closing of the interstitial spaces and pores in the SAP-fluff matrix. Since the transport of liquid by diffusion through a swollen hydrogel is much slower than transport through the interstitial spaces, a sealing effect occurs in the area of fluid entry. This effect is often referred to as "gel blocking." Subsequent amounts of fluid can no longer penetrate into the absorbent core and tend to flow in an uncontrolled manner across the surface of the already superficially saturated area to its edge, resulting in undesirable leakage from the absorbent core.

In addition, the storage capacity of the absorbent core decreases, since as a result of the gel blocking of the particles near the surface, the highly swellable polymers embedded deeper in the absorbent core can no longer be reached by subsequent body fluid doses, and hence can not contribute to the total storage capacity.

One approach to the gel blocking problem is to alter the absorption velocity properties of the superabsorbent polymers. For example, U.S. Pat. No. 4,548,847 describes hydrogels reversibly crosslinked by means of at least divalent metal cations, such as $Ca^{+2}$ or $Ba^{+2}$. The patent teaches that a delay in swelling can be accomplished by application of so-called "cation removal agent." Preferred examples of these are water-soluble compounds such as $Na_2HPO_4$, sodium hexameta-phosphate and the disodium salt of ethylenediaminetetraacetic acid. The effect of these substances is that the reversible crosslinking sites formed by at least divalent metal cations are destroyed by the cation removal agent. With reduced crosslinking density, the product is able to swell more. The patent also describes absorbent articles that contain the absorbent polymers with the delayed swelling feature. An absorbent article built in layers (wound dressing) is described, for instance, in which each layer contains the polymers according to the invention.

GB 2,280,115 A describes an absorbent article that contains coated superabsorbent particles in the area in which body fluids are released. The coating of the superabsorbent particles prevents swelling until the coating has dissolved in the test or body fluid or has been penetrated by it. These are superabsorbent particles that exhibit an activation time until swelling begins, which time can be varied by the coating's material and thickness. Some of the coating materials disclosed are non-reactive polysaccharides such as gelatin, microcrystalline cellulose and cellulose derivatives. The activation period to the start of swelling should be at least 5, preferably 15 and more strongly preferred, 60 minutes.

Coated superabsorbent polymers have the disadvantage that even a small initial wetting, without necessarily leading to the swelling of the highly swellable polymers, leads to a destruction of the surface treatment by dissolution, detachment, swelling or decomposition. Once the coating around the polymers has dissolved, such superabsorbent polymers exhibit the high swelling rate of a conventional material without surface treatment. Thus the desired effect of improved liquid management in the absorbent material is lost.

EP 0 631 768 A1 describes an absorbent article that uses superabsorbent polymers with different absorption velocities. The differences in absorption velocities between the various conventional superabsorbent polymers used arise from different particle size distributions (type 1: 600–850 $\mu$m, type 2: <250 $\mu$m) and are correspondingly small.

The problem of gel blocking has been particularly noted in multilayer absorbent articles. One means of solving this problem has been to incorporate slow-rate polymers into the articles. Several means of producing these have been suggested. However, none of these methods produce a totally satisfactory slow-rate polymer.

It would be desirable to have a process for preparing a superabsorbent polymer having a slow rate of absorption which would not require the use of a cation removing agent or a coating for the polymer. One clear advantage of such a process is the cost savings associated with eliminating the use of the extra materials.

SUMMARY OF THE INVENTION

The present invention includes an improved process for the preparation of superabsorbent polymers having a slow rate of absorption, and the polymers prepared by the process. More specifically, the process is a process for the preparation of water-swellable, water-insoluble polymer particles having a slow rate of water absorption, the process comprising polymerizing a monomer in the presence of a covalent crosslinking agent and a polyvalent metal coordination compound under conditions such that there is formed a polymer having reversible cationic crosslinks and such that the metal is distributed essentially homogeneously throughout the polymer particles. The polymer of the invention is a water-swellable, water-insoluble polymer having a slow rate of absorption, the polymer being crosslinked with a covalent crosslinking agent and the metal of a polyvalent metal coordination compound and having the metal of the coordination compound distributed essentially homogeneously throughout the polymer, wherein the Absorption Rate Index is at least about 5 minutes. In another embodiment, the present invention includes articles containing the slow rate superabsorbent polymer.

DETAILED DESCRIPTION OF THE INVENTION

A preferred process for preparing the improved water-swellable, water-insoluble polymer of the invention involves polymerizing a suitable monomer in the presence of a covalent crosslinking agent and a polyvalent metal coordination compound.

The term "Absorption Rate Index" (ARI) refers to the Absorption Rate Index as measured according to the ARI Test Method described hereinbelow.

The polyvalent metal coordination compound can be any coordination compound which contains a polyvalent metal, which is at least partially soluble in the reaction mixture under reaction conditions, and which can be used to prepare a superabsorbent polymer having an Absorption Rate Index of at least five minutes. The polyvalent metal coordination compound is preferably water soluble. The polyvalent metal coordination compound may be added directly as a compound, such as aluminum citrate, or may be formed in situ by adding precursor components such as, in the case of aluminum citrate, for example, an aluminum salt, such as aluminum sulfate, and a source of the desired ligand, such as, in the case of aluminum citrate, for example, citric acid. Preferably, the metal cation has a valence of at least +3, with Al being most preferred. Examples of preferred ligands in the polyvalent metal coordination compound include citrates, oxylates, lactates, glycinates, ethylenediaminetetraacetic acid, and acetates, with citrates being most preferred. Aluminum citrate is the most preferred polyvalent metal coordination compound and is readily commercially available. Mixtures of polyvalent metal coordination compounds or their precursors can be employed. In a preferred embodiment, the coordination compound is essentially free of divalent metal ions.

In the present invention, a polyvalent metal coordination compound suitably is employed in an amount sufficient to produce a polymer having an Absorption Rate Index which is at least about 5 minutes. Preferably, at least 0.003 mole of metal ion of the polyvalent metal coordination compound is employed per mole of carboxyl moieties on the substrate polymer. More preferably, at least about 0.016 mole of metal ion of the polyvalent metal coordination compound, and most preferably at least about 0.03 mole of metal ion of the polyvalent metal coordination compound is employed per mole of carboxyl moieties on the substrate polymer. Preferably, no more than about 0.1 mole of metal ion of the polyvalent metal coordination compound is employed; more preferably, no more than about 0.086 mole of metal ion of the polyvalent metal coordination compound is employed; and most preferably, no more than 0.07 mole of metal ion of the polyvalent metal coordination compound is employed per mole of carboxyl moieties on the substrate polymer.

Preferably, the amount of metal ion of the polyvalent metal coordination compound employed is from 0.003 to 0.1 mole, more preferably from 0.016 to 0.086 mole; and most preferably from 0.03 to 0.07 mole per mole of carboxyl moieties on the substrate polymer.

The preferred process of the invention involves polymerizing a suitable monomer in the presence of a covalent crosslinking agent and a polyvalent metal coordination compound.

The water-swellable or lightly crosslinked hydrophilic polymers suitably employable in the present invention can be any of the known hydrophilic polymers which are capable of absorbing large quantities of fluids. In particular, water-absorbent polymers useful in this invention are water-absorbent polymers which contain carboxyl moieties. Preferably, at least about 0.01 equivalent of carboxyl groups are present per 100 grams of the water-absorbent resin.

Among preferred carboxyl-containing water absorbent polymers are hydrolyzates of starch-acrylonitrile graft copolymers, partially neutralized products of starch-acrylic acid or polyvinyl alcohol graft copolymers, saponification products of vinyl acetate acrylic ester copolymers, derivatives of copolymers of isobutylene and maleic anhydride, hydrolyzates of acrylonitrile copolymers, crosslinked products of hydrolyzates of acrylonitrile copolymers, crosslinked carboxymethyl cellulose, polyaspartates, hydrolyzates of acrylamide copolymers, crosslinked products of hydrolyzates of acrylamide copolymers, partially neutralized products of polyacrylic acids and crosslinked products of partially neutralized polyacrylic acids.

Examples of some suitable water-swellable, water-insoluble polymers and processes, including gel polymerization processes, for preparing them are disclosed in U.S. Pat. Nos. 3,997,484; 3,926,891; 3,935,099; 4,090,013; 4,093,776; 4,340,706; 4,446,261; 4,683,274; 4,459,396; 4,708,997; 4,076,663; 4,190,562; 4,286,082; 4,857,610; 4,985,518; and 5,145,906, the teachings of which are incorporated herein by reference. In addition, see Buchholz, F. L. and Graham, A. T., "Modern Superabsorbent Polymer Technology," John Wiley & Sons (1998). Such hydrophilic polymers are prepared from water-soluble α,β-ethylenically unsaturated monomers such as monocarboxylic acids, polycarboxylic acids, acrylamide and their derivatives.

Suitable α,β-ethylenically unsaturated monomers include, for example, acrylic acid, methacrylic acid, crotonic acid, isocrotonic acid and alkali metal salts and ammonium salts thereof; itaconic acid, acrylamide, methacrylamide and 2-acrylamido-2-methyl-1-propane sulfonic acid and its salts. The preferred monomers include acrylic acid and methacrylic acid and their respective salt forms such as alkali metal or ammonium salts. The water-soluble monomers useful in the present invention may be used in amounts ranging from 10 percent to 80 percent by weight based on the total weight of the aqueous monomer solution. Preferably, the amount ranges from 15 percent to 60 percent based on the total weight of the aqueous monomer solution.

Optionally, minor amounts of other water-soluble, unsaturated monomers, such as alkyl esters of the acid monomers, for example, methyl acrylate or methyl methacrylate may be present in the water absorbent polymer. In addition, certain grafting polymers, such as, for example, polyvinyl alcohol, starch and water soluble or swellable cellulose ethers may be employed to prepare products having superior properties. Such grafting polymers, when employed, are used in amounts up to about 10 weight percent based on the α,β-ethylenically unsaturated monomer.

The polymerization may be carried out using acid monomers that are not neutralized or that have been neutralized or partially neutralized prior to the polymerization. Neutralization is conveniently achieved by contacting the aqueous monomer with an amount of basic material sufficient to neutralize between 20 and 95 percent of the acid groups present in the acid monomers. Preferably, the amount of basic material will be sufficient to neutralize between about 40 percent and 85 percent, and most preferably between about 55 percent and about 75 percent of the acid groups present in the acid monomers.

Compounds which are useful to neutralize the acid groups of the monomer are typically those which will sufficiently neutralize the acid groups without having a detrimental effect on the polymerization process. Examples of such compounds include alkali metal hydroxides, and alkali metal carbonates and bicarbonates. Preferably, sodium or potassium hydroxides or carbonates are employed to neutralize the monomer. In determining the desired degree of neutralization, care must be taken to ensure that the pH of the resulting crosslinked absorbent polymer, which will be contacted with or dispersed in an aqueous fluid to be absorbed, is maintained in a range appropriate for the applications for which the polymer is intended. Alternatively, the polymerization may be carried out employing unneutralized monomers and thereafter neutralizing, as is known in the art.

Conveniently, a conventional vinyl addition polymerization initiator is used in the polymerization of the water-soluble monomers and the crosslinking agent. A free radical polymerization initiator which is sufficiently soluble in the monomer solution to initiate polymerization is preferred. For example, water soluble persulfates such as potassium persulfate, ammonium persulfate, sodium persulfate, and other alkali-metal persulfates, hydrogen peroxide and water soluble azo-compounds such as 2,2'-azobis-(2-amidinopropane) hydrochloride may be used. Some of these initiators, such as hydrogen peroxide, can be combined with reducing substances such as sulfites or amines to form known redox type initiators. The total amount of initiators used may range from 0.01 to 1.0 weight percent, preferably 0.01 to 0.5 weight percent, based on the total weight of $\alpha,\beta$-ethylenically unsaturated monomer reactants.

The water-absorbent resin will preferably be lightly covalently crosslinked to render it water-insoluble and water-swellable. The desired crosslinked structure may be obtained by the copolymerization of the selected water-soluble monomer and a crosslinking agent possessing at least two polymerizable double bonds in the molecular unit. The crosslinking agent is present in an amount effective to covalently crosslink the water-soluble polymer. The preferred amount of crosslinking agent is determined by the desired degree of absorption capacity and the desired strength to retain the absorbed fluid, that is, the desired absorption under load (AUL). Typically, the crosslinking agent is used in amounts ranging from 0.0005 to 5 parts by weight per 100 parts by weight of $\alpha,\beta$-ethylenically unsaturated monomer used. More preferably, the amount ranges from 0.1 to 1 part by weight per 100 parts by weight of the $\alpha,\beta$-ethylenically unsaturated monomer. Usually, if an amount over about 5 parts by weight of crosslinking agent per 100 parts monomer is used, the resulting polymer has too high a crosslinking density and exhibits a reduced absorption capacity and increased strength to retain the absorbed fluid. If the crosslinking agent is used in an amount less than about 0.0005 part by weight per 100 parts monomer, the polymer usually has too low a crosslinking density, and when contacted with the fluid to be absorbed becomes sticky and exhibits a lower initial absorption rate.

While the covalent crosslinking agent will typically be soluble in the aqueous solution of the $\alpha,\beta$-ethylenically unsaturated monomer, the crosslinking agent may be merely dispersible in such a solution without negative implications. The use of such dispersing agents is disclosed in U.S. Pat. No. 4,833,222, the teachings of which are incorporated herein by reference. Suitable dispersing agents include carboxymethyl cellulose suspending aids, methyl cellulose, hydroxypropyl cellulose, and polyvinyl alcohol. Such dispersing agents are typically provided at a concentration between about 0.005 and about 0.1 weight percent, based on the total weight of $\alpha,\beta$-ethylenically unsaturated monomer reactants.

Typical covalent crosslinking agents include monomers having in one molecule 2 to 4 groups selected from the group consisting of $CH_2=CHCO-$, $CH_2=C(CH_3)CO-$ and $CH_2=CH-CH_2-$. Exemplary covalent crosslinking agents include: diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; highly ethoxylated trimethylol propane triacrylate; tetracrylate and tetramethacrylate of pentaerythritol; allyl methacrylate; and tetraallyloxyethane. Mixtures of covalent crosslinking agents can be employed.

In a preferred embodiment for making polymers useful in the practice of this invention, an aqueous solution of the $\alpha,\beta$-ethylenically unsaturated monomer in the partially neutralized form, the covalent crosslinking agent, the polyvalent metal coordination compound, the initiator and a grafting polymer substrate, if desired, is prepared. The polymerization of the mixture may be initiated by elevating the temperature of the mixture containing the initiator or by using a redox-type initiator as described above. Generally, the temperature at which polymerization will begin ranges from 5° C. to 45° C. The temperature at which the polymerization is carried out is highly dependent on the type of monomers used and the specific initiator system employed. Preferably, the maximum temperature of polymerization ranges from 50° C. to 100° C., most preferably from 60° C. to 100° C.

The resultant polymer is typically pre-sized and dried using means well-known in the art. Suitable drying means include fluidized bed driers, rotary driers, forced air ovens and through-circulation band dryers. In some instances, drying will occur in two or more stages, that is, multi-stage drying. Following the completion of drying, the polymer is further sized to form particles preferably having an average diameter less than about 2 mm and more preferably less than about 1 mm. Preferably, the final polymer product has an average particle size of at least 160 microns.

To further decrease the rate of absorption, the dried particles may be heat treated in accordance with the procedures set forth in WO 93/05080, and/or U.S. Pat. No. 5,629,377, the teachings of which are incorporated herein by reference. Such heat treatment is preferably carried out at a temperature of at least about 170° C., more preferably of at least 180° C., and most preferably of at least about 190° C. Such heat treatment is preferably carried out at a temperature of less than about 250° C., more preferably less than about 240° C. The method of heat treatment is not critical. For example, forced air ovens, fluidized bed heaters, heated screw conveyors, and the like may be successfully employed. If desired, the heated polymer may be remoisturized for ease in handling.

A way to improve absorptive properties of the polymer particles may be to surface crosslink the polymer particles. Procedures for surface crosslinking are well known in the art and described in, for example, U.S. Pat. No. 4,734,478 and U.S. Pat. No. 4,666,983. These procedures may increase the modulus and/or the absorbency under load of the polymer particles.

The composition of the invention can optionally include other additives such as, for example, anticaking agents. Anticaking agents are well-known. Silica is an example of a preferred anticaking agent.

The composition of the invention exhibits a slow rate of absorbency. Preferably, the composition has an Absorption Rate Index of at least about 5 minutes, more preferably at least about 10 minutes, even more preferably at least about 20 minutes and most preferably at least about 30 minutes.

The superabsorbent polymers of this invention are useful in the manufacture of moisture absorbent articles, such as disposable diapers, sanitary napkins, incontinence garments and bandages. The superabsorbent compositions of this invention are particularly useful in the manufacture of thin and ultra thin disposable diapers which have excellent moisture absorbence capacity, fluid distribution properties and reduced leakage. For example, the superabsorbent polymers of this invention can be used in the manufacture of absorbent articles such as those described in U.S. Pat. Nos. 3,669,103; 3,670,731; 4,654,039; 4,430,086; 4,973,325; 4,892,598; 4,798,603; 4,500,315; 4,596,567; 4,676,784; 4,938,756; 4,537,590; 4,673,402; 5,061,259; 5,147,343; and 5,149,335; the teachings of which are hereby incorporated by reference. Construction of diapers and other absorbent articles is well known, and materials useful as fluff in absorbent articles are also well known. For the purposes of the present invention, the term "fluff" is given its meaning as understood by those of ordinary skill in the art. Examples of fluff include cotton fibers, curly fibers, wood pulp fibers, synthetic fibers, or a combination thereof, which are formed into a pad and absorb primarily by capillary attraction mechanism. See, e.g., U.S. Pat. No. 4,610,678.

In making absorbent articles with the compositions of this invention, the superabsorbent composition may be mixed with, attached to, layered in, or dispersed in a porous matrix of fibers. Such matrices are made with hydrophilic fibers such as wood pulp or fluff, cotton linters, and synthetic fibers or a mixture of the fibers and the wood fluff. The fibers can be loose or joined as in nonwovens. Examples of synthetic fibers include those made using polyethylene, polypropylene, polyesters, and copolymers of polyesters and polyamides. The synthetic fibers may be meltblown fibers or fibers which have been treated to render them hydrophilic.

The superabsorbent polymers of this invention are even more advantageously utilized in absorbent structures that incorporate superabsorbent polymers having a slow absorption rate, either alone or in tandem with superabsorbent polymers having different absorption rates, in multi-compartmentalized or multi-layered structures. Examples of such structures are described in U.S. Pat. Nos. 4,338,371; 4,935,022; 5,364,382; 5,429,629; 5,486,166; 5,520,673; 5,531,728; 5,562,646; and 5,728,082, the teachings of which are incorporated herein by reference.

The superabsorbent polymers of this invention are also advantageously used in those manufacturing processes where contact with aqueous fluids is inherent to the process. In these processes, slow absorption rate helps to prevent excessive superabsorbent swelling, which swelling results in large amounts of water to be removed and large volume changes occurring upon drying. Examples of such processes are wet-laid composite processes, and processes for making foam absorbent structures. Examples of wet-laid composite processes are described in U.S. Pat. Nos. 4,354,901; 4,986,882; 5,300,192; 5,308,896; 5,538,783; 5,543,215; 5,795,439 and 5,651,862, the teachings of which are incorporated hereby reference. Examples of foam absorbent structures are described in U.S. Pat. Nos. 4,990,541 and 5,011,864.

Absorbent articles, such as disposable diapers, typically are made with a liquid-impermeable backing material, a liquid-permeable bodyside facing material and the liquid-absorbing composite sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing urine.

The absorbent articles of the invention may comprise from 5 percent to 95 percent by weight of the superabsorbent polymers of the invention. In a typical absorbent article, the superabsorbent polymer of the invention can be dispersed in a fiber matrix; in such an article the superabsorbent advantageously is present in an amount from about 30 to 70 weight percent based on the weight of the article and the fiber matrix is present in an amount of from about 70 to 30 weight percent based on the weight of the article. In another form of absorbent article, the superabsorbent may be present in a containment structure in which the superabsorbent polymer is present in an amount of about 30 to 95 percent by weight. Combinations of dispersed superabsorbent polymer and contained superabsorbent polymer are also known.

The following examples and comparative experiments are given to illustrate the invention and should not be construed as limiting its scope. All parts and percentages are by weight unless otherwise indicated.

Specific Embodiments of the Invention

The absorption capacity (AC) is measured according to the method stated in Buchholz, F. L. and Graham, A. T., "Modern Superabsorbent Polymer Technology," John Wiley & Sons (1998), page 153.

Homogeneous distribution of the metal of the metal salt of the invention in the superabsorbent polymer is measured according to the electron microprobe analysis method as described at Buchholz, F. L. and Graham, A. T., id. at pages 57–58.

ARI Test Method: Method for Determination of the Absorption Rate Index

A 100 mL graduated cylinder is filled with 100 mL of 0.9 wt % aqueous saline solution. A superabsorbent polymer sample is screened to −30/+50 mesh using ASTME-11 specification screens. A 1.00 g portion of the screened polymer is dumped into the graduated cylinder. When the sample first reaches the bottom of the graduated cylinder, a timer accurate to the nearest second is started. The volume of the gel layer is measured at times of 0.5, 1, 2, 3, 4, 5, 6, 8, 10, 15, 30, 60, 90, 180, 330 and 480 minutes. The data is plotted and the time required for the gel volume to reach 60% of its value at 8 hours is determined by interpolation. This time is reported as the t60 time, and for the purposes of the present invention is the "Absorption Rate Index."

EXAMPLE 1

Preparation of the Aluminum Citrate Complex

Into a 200 mL beaker containing 45.6 g deionized water is dissolved 10.20 g citric acid (Aldrich Chemical). To this is added 35.4 g aluminum sulfate 14 hydrate (General Chemical). The mixture is stirred for 5 minutes.

Preparation of the Monomer Solution

A solution of 169.14 g of sodium carbonate in deionized water is prepared in a 1 L beaker. In a 2 L beaker is placed 353.49 g glacial acrylic acid. To this is added 1.77 g highly ethoxylated trimethylol propane triacrylate (HeTMPTA) (SARTOMER #9035, Sartomer). A 276.8 g portion of deionized water is then added followed by 0.44 g VERSENEX 80 (The Dow Chemical Company). The carbonate solution is then slowly added from an addition funnel. The solution of aluminum sulfate and citric acid is then added.

Polymerization

The monomer mix is placed in a 2 L jacketed resin kettle equipped with an agitator rotating at 30 RPM. The jacket temperature is set to 30° C. and nitrogen is sparged through the solution at a rate of 750 sccm to deoxygenate the monomer mix. After one hour of deoxygenation, 0.12 g 30 wt % hydrogen peroxide is added followed by 5.66 g 10 wt % sodium persulfate. The polymerization begins immediately. The temperature rises to 78° C. in 8 minutes, then the kettle is cooled to keep its temperature below 86° C. As the exotherm subsides, the jacket temperature is set to 65° C. and held there for three hours.

Drying and Sizing

The reaction mass is in the form of crumbs. Those pieces larger than about 2.5 cm are removed, and 300 g of the remainder is dried at 165° C. for 30 min. The dried product is ground in a roll mill and is then screened to −20/+120 mesh using ASTME-11 specification screens.

The two hour AC of the sample is 26.0 g/g. The swelling rate of the sample is characterized using the ARI Test Method, and the Absorption Rate Index is determined to be 12 minutes.

Comparative Experiment A

The procedure of Example 1 is repeated except that no aluminum citrate complex is employed. Polymerization initiation requires the addition of 0.53 g sodium erythorbate after the addition of the persulfate. This sample has a two-hour AC of 31.3 g/g and an Absorption Rate Index of 2½ minutes.

EXAMPLES 2–16

The procedure of Example 1 is repeated with variations as shown in Table I and except that the aluminum sulfate is a 50 wt % solution of iron-free grade available from General Alum and Chemical Corporation. The samples are also heat-treated at various temperatures for an additional ½ hour. The 8 hour capacity in Table I is defined as: 0.6*(gel volume at 8 hr)−1.7, wherein the gel volume is measured according to the ARI Test Method defined hereinabove.

Table I

Results of Examples 2–16

| Example Number | HeTMPTA (g) | 50% Aluminum Sulfate (g) | Citric Acid (g) | Heat-treatment Temperature (deg C.) | 8 Hour Capacity (g/g) | Absorption Rate Index (min) |
|---|---|---|---|---|---|---|
| 2 | 1.06 | 88.50 | 19.13 | 185 | 28.6 | 27.7 |
| 3 | 1.06 | 88.50 | 19.13 | 185 | 28.3 | 25.8 |
| 4 | 1.77 | 70.80 | 15.30 | 185 | 26.8 | 17.5 |
| 5 | 1.06 | 88.50 | 19.13 | 185 | 28.6 | 28.7 |
| 6 | 1.06 | 70.80 | 15.30 | 175 | 33.3 | 22.4 |
| 7 | 1.77 | 88.50 | 19.13 | 175 | 26.5 | 23.1 |
| 8 | 1.06 | 106.20 | 22.95 | 195 | 26.0 | 45.7 |
| 9 | 0.35 | 70.80 | 15.30 | 185 | 41.5 | 30.7 |
| 10 | 1.06 | 106.20 | 22.95 | 175 | 26.5 | 39.3 |
| 11 | 1.06 | 70.80 | 15.30 | 195 | 31.8 | 24.0 |
| 12 | 1.77 | 106.20 | 22.95 | 185 | 22.1 | 26.0 |
| 13 | 0.35 | 106.20 | 22.95 | 185 | 31.8 | 49.8 |
| 14 | 0.35 | 88.50 | 19.13 | 195 | 39.5 | 48.3 |
| 15 | 1.77 | 88.50 | 19.13 | 195 | 24.8 | 24.3 |
| 16 | 0.35 | 88.50 | 19.13 | 175 | 37.7 | 44.3 |

What is claimed is:

1. A water-insoluble, water-swellable polymer having an Absorption Rate Index of at least about 5 minutes, wherein the polymer is covalently crosslinked, and the amount of covalent crosslinker is sufficient to impart water-insolubility to the polymer, and wherein the polymer contains a homogeneous distribution of a metal from a polyvalent metal coordination compound, wherein a metal cation of the polyvalent metal coordination compound has a valence of at least +3, and the polymer is reversibly cationically crosslinked.

2. The polymer of claim 1 wherein the metal is aluminum.

3. The polymer of claim 1 wherein the Absorption Rate Index is at least 10 minutes.

4. The polymer of claim 1 wherein the Absorption Rate Index is at least 20 minutes.

5. The polymer of claim 1 wherein the Absorption Rate Index is at least 30 minutes.

6. The polymer of claim 1 wherein the polymer is selected from the group consisting essentially of the copolymers of acrylamide and acrylic acid, partially neutralized products of starch-acrylic acid or starch-polyvinyl alcohol graft copolymers, saponification products of vinyl acetate acrylic ester copolymers, derivatives of copolymers of isobutylene and maleic anhydride, partially neutralized products of polyacrylic acids, crosslinked products of hydrolyzates of acrylonitrile copolymers, crosslinked carboxymethyl cellulose, polyasparates, hydrolyzates of acrylamide copolymers, and hydrolyzates of starch-acrylonitrile graft copolymers.

7. The polymer of claim 1 wherein the polymer is partially neutralized polyacrylic acid.

8. The polymer of claim 1 wherein the metal cation of the polyvalent metal coordination compound is aluminum.

9. The polymer of claim 1 wherein the ligand of the polyvalent metal coordination compound is citrate.

10. The polymer of claim 7 wherein the metal cation of the polyvalent metal coordination compound has a valence of +3.

11. The polymer of claim 1 wherein the coordination compound is aluminum citrate.

12. An absorbent article comprising the composition of claim 1.

13. The article of claim 11 which is a diaper or part of a diaper wherein the weight ratio of superabsorbent polymer composition to fluff is at least 0.3.

14. A covalently crosslinked, water-insoluble, water-swellable partially neutralized polyacrylic acid having an Absorption Rate Index of at least about 5 minutes, wherein the amount of covalent crosslinker is sufficient to impart water-insolubility to the polymer, which contains a homogeneous distribution of aluminum ions from an aluminum coordination compound, and which is reversibly cationically crosslinked.

15. The polymer of claim 14 wherein the ligand of the polyvalent metal coordination compound is citrate.

16. The polymer of claim 14 wherein the Absorption Rate Index is at least 10 minutes.

17. The polymer of claim 14 wherein the Absorption Rate Index is at least 20 minutes.

18. The polymer of claim 14 wherein the Absorption Rate Index is at least 30 minutes.

19. The polymer of claim 14 comprising at least 0.003 mole of aluminum per mole of carboxyl moieties on the polymer.

20. An absorbent article comprising the polymer of claim 1.

* * * * *